United States Patent
Kim et al.

(10) Patent No.: US 10,334,708 B2
(45) Date of Patent: Jun. 25, 2019

(54) SMART MOOD LIGHTING CONTROL USING WHEEL INTERFACE OF SMARTWATCH

(71) Applicant: Sangmyung University Industry-Academy Cooperation Foundation, Seoul (KR)

(72) Inventors: Bo Ram Kim, Gyeonggi-do (KR); Dong Keun Kim, Seoul (KR)

(73) Assignee: SANGMYUNG UNIVERSITY INDUSTRY-ACADEMY COOPERATION FOUNDATION, Seoul (KR)

( * ) Notice: Subject to any disclaimer, the term of this patent is extended or adjusted under 35 U.S.C. 154(b) by 0 days.

(21) Appl. No.: 16/067,266

(22) PCT Filed: Mar. 17, 2017

(86) PCT No.: PCT/KR2017/002868
§ 371 (c)(1),
(2) Date: Jun. 29, 2018

(87) PCT Pub. No.: WO2017/195976
PCT Pub. Date: Nov. 16, 2017

(65) Prior Publication Data
US 2019/0014649 A1    Jan. 10, 2019

(30) Foreign Application Priority Data

May 10, 2016  (KR) .......................... 10-2016-0057132

(51) Int. Cl.
*H05B 37/02*     (2006.01)
*G04G 21/04*     (2013.01)
(Continued)

(52) U.S. Cl.
CPC ......... *H05B 37/0272* (2013.01); *G04B 19/28* (2013.01); *G04G 21/04* (2013.01);
(Continued)

(58) Field of Classification Search
CPC ............ G08C 2201/30; G08C 2201/51; G08C 2201/93; G08C 17/00; G05B 15/02; H05B 33/0842; H05B 33/0863; F21W 2111/10
See application file for complete search history.

(56) References Cited

U.S. PATENT DOCUMENTS

2016/0007430 A1 *  1/2016  Kidakarn ........... H05B 37/0272
                                             315/185 S
2016/0086554 A1    3/2016  Suzuki
2018/0013947 A1 *  1/2018  Kim ........................ G06F 13/14

FOREIGN PATENT DOCUMENTS

EP           2863276 A2     4/2015
JP        2016-062056 A     4/2016
(Continued)

*Primary Examiner* — Thuy V Tran
(74) *Attorney, Agent, or Firm* — Buchanan Ingersoll & Rooney PC

(57) ABSTRACT

Described is a smart lighting method and device. A smart lighting control method comprises the steps of: operating a smart bulb, which includes a control unit for controlling at least one lighting attribute among attributes of saturation, brightness, and color-temperature, and an LED lamp operated by the control unit; acquiring a current attribute of the LED lamp by using a smartwatch communicatably connected with the control unit; selecting an attribute to be controlled, through an interface panel of the smartwatch; obtaining a control attribute value for adjusting the lighting attribute, by using a rotation interface of the smartwatch; and transmitting the control attribute value from the smartwatch to the smart bulb and adjusting a lighting attribute of the smart bulb by using the transmitted control attribute value.

10 Claims, 10 Drawing Sheets

(51) Int. Cl.
*G04G 21/08* (2010.01)
*G04B 19/28* (2006.01)
*H05B 33/08* (2006.01)
*G06F 3/03* (2006.01)
*G08C 17/00* (2006.01)

(52) U.S. Cl.
CPC ........... *G04G 21/08* (2013.01); *G06F 3/0312* (2013.01); *H05B 33/08* (2013.01); *H05B 33/0845* (2013.01); *H05B 37/02* (2013.01); *G08C 17/00* (2013.01); *G08C 2201/51* (2013.01); *G08C 2201/93* (2013.01); *H05B 33/0863* (2013.01); *Y02B 20/348* (2013.01); *Y02B 20/42* (2013.01); *Y02B 20/48* (2013.01)

(56) References Cited

FOREIGN PATENT DOCUMENTS

| KR | 10-2014-0122908 A | 10/2014 |
| KR | 10-2015-0045257 A | 4/2015 |
| KR | 10-2015-0134594 A | 12/2015 |
| KR | 10-1603573 B1 | 3/2016 |
| KR | 10-2016-0043837 A | 4/2016 |

\* cited by examiner

FIG. 2
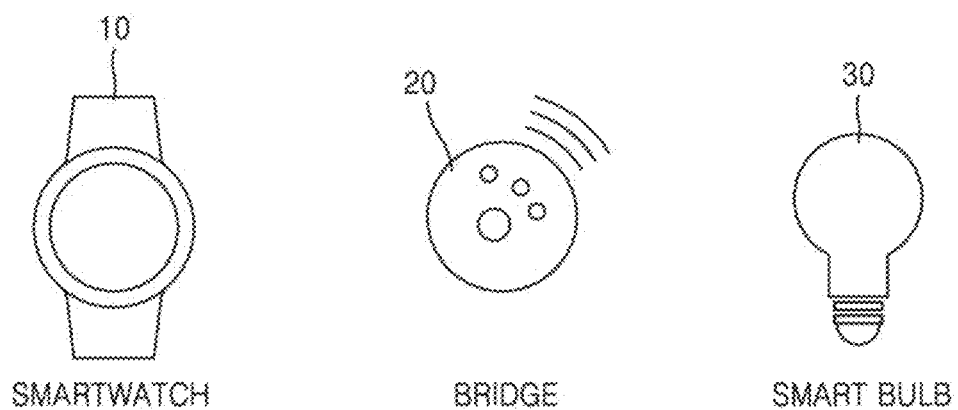
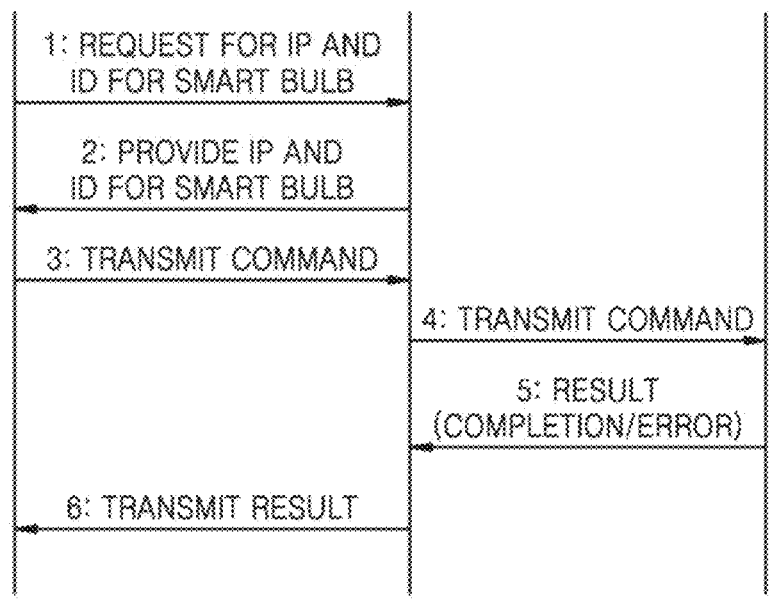

SMART MOOD LIGHTING CONTROL USING WHEEL INTERFACE OF SMARTWATCH

TECHNICAL FIELD

The present disclosure relates to a mood lighting control method and device, and more particularly, to smart mood lighting control using a wheel interface of a smartwatch.

BACKGROUND ART

Various wearable devices have recently been introduced and especially variable wearable devices such as smartwatches and smart glasses which may be used together with existing smartphones have been launched. Accordingly, users are using wearable devices for various purposes. So far, a user controls lighting by directly manipulating a switch or a remote controller or by using a smartphone even when a smart device is used. When an existing smartphone is used, a color spectrum is displayed on a large display screen and a user directly touches a desired color. Accordingly, various attributes such as hue and saturation may not be controlled at a time, and hue, brightness, and saturation have to be individually manipulated.

REFERENCE DOCUMENTS

1. KR10-2015-0134594 A
2. KR10-2015-0045257 A
3. Seong-Hyu Shin and Hwan-Yong Kim "Wireless LED Lighting Control Using Smartphones", 2015, the Korea Academia-Industrial Cooperation Society
4. Eun-Ja Jo, Chi-Ho Lin "Smart Emotional Lighting Control System Based on Android Platform" 2014, the Institute of Internet, Broadcasting and Communication

DESCRIPTION OF EMBODIMENTS

Technical Problem

The present disclosure provides a lighting control method and device using a smartwatch having a circular bezel.

The present disclosure provides a lighting control method and device for more finely and conveniently controlling lighting by applying a circular bezel that is a rotary encoder to a wheel interface.

Solution to Problem

A lighting control method according to the present disclosure includes: operating a smart bulb including a controller configured to control at least one lighting attribute from among saturation, brightness, and color temperature and a light-emitting diode (LED) lamp configured to be operated under control of the controller; obtaining a current attribute of the LED lamp by using a smartwatch communicatably connected to the controller; selecting a lighting attribute to be controlled through an interface panel of the smartwatch; obtaining a control attribute value for adjusting the lighting attribute by using a wheel interface having a circular bezel provided around the smartwatch; and transmitting the control attribute value from the smartwatch to the smart bulb and adjusting the lighting attribute of the smart bulb by using the control attribute value.

According to an embodiment of the present disclosure, a bridge may be wirelessly connected between the smartwatch and the smart bulb and configured to connect the smartwatch to the smart bulb.

According to another embodiment of the present disclosure, the lighting attribute to be controlled may vary according to a rotation direction of the circular bezel.

According to another embodiment of the present disclosure, the bridge may be further configured to provide authentication information for connecting the smartwatch to the smart bulb.

According to another embodiment of the present disclosure, the bridge may be further configured to obtain the authentication information from an authentication server that is provided separately.

Advantageous Effects of Disclosure

The present disclosure suggests a system for controlling emotional lighting by using a wheel interface using a circular bezel of a smartwatch. Existing lighting control systems control lighting directly by using a switch or by using a smartphone. Since the existing lighting control systems use detailed lighting control or a complex interface, user satisfaction in ease of manipulation is not high. Lighting may be conveniently and finely controlled by using a wheel interface of a smartwatch. User satisfaction with a lighting control system may be increased. Also, the present disclosure profiles a user's emotion information, time information, and position information.

BRIEF DESCRIPTION OF DRAWINGS

FIG. 2 is a schematic diagram for explaining control of a smart bulb by using a smartwatch.

MODE OF DISCLOSURE

Preferred embodiments of a smart lighting control method according to the present disclosure will now be described in detail.

A smart lighting control method of the present disclosure uses a smartwatch and a smart bulb. A product having a circular or annular bezel, e.g., Samsung Gear S2, in which a wheel interface (rotary encoder) may be implemented, may be used as the smartwatch. A communication system that is a model using Bluetooth without 3G uses wireless Internet. Connectivity is offered by Bluetooth 4.1 and wireless LAN 802.11 b/g/n 2.4 GHz. An operating system (OS) of the Samsung Gear S2 having a circular bezel that is a smartwatch used as an example of the present disclosure is a Tizen OS. It is developed based on a web application platform, and a Tizen integrated development environment (IDE) is used as a development tool. A software development kit (SDK) version is developed by using 2.4.0 Rev4.

The smart bulb includes a light-emitting diode (LED) lamp (bulb), a controller for controlling the LED lamp, and a communicator, and, regarding basic specifications, a base type, a size, and a lifetime of the LED lamp are respectively E26, A19, and 15,000 hours. A brightness value of the LED lamp is 600 lm at 6500 K, 600 lm at 4000 K, 510 lm at 3000 K, and 360 lm at 2000 K It is preferable that a color temperature value ranges from 2000 K to 6500 K and 16 million colors are produced.

For example, a bridge may be used as a wireless communication interface device for connecting the smartwatch to the smart bulb. A frequency band may range from 2400 MHz to 2483.5 MHz, and a plurality of lamps may be controlled by using one bridge.

Figure 1:
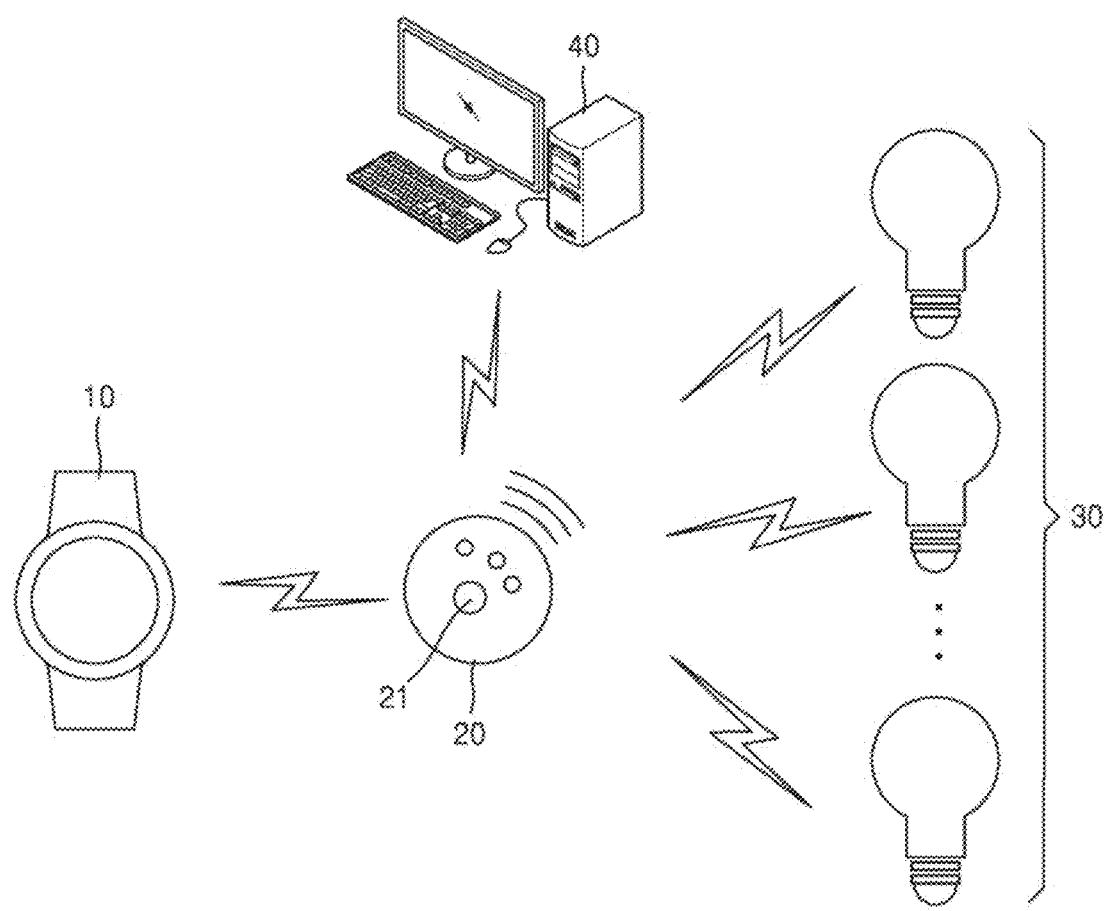
FIG. 1 is a schematic diagram of a smart lighting control system in which a lighting control method according to the present disclosure is performed.

FIG. 1 is a schematic diagram of a smart lighting control system in which a lighting control method according to the present disclosure is performed. FIG. 2 is a schematic diagram for explaining control of a smart bulb 30 by using a smartwatch 10.

As shown in FIG. 1, the smart lighting control system may include a smartwatch 10 that is a wearable smartwatch, one or more smart bulbs 30, and a bridge 20 between the smartwatch 10 and the smart bulbs 30. In addition, according to an embodiment of the present disclosure, the bridge 20 may be connected to an authentication server 40 that is separately provided to maintain access security for the smart bulbs 30. The authentication server 40 may obtain authentication information including an Internet protocol (IP) and a security identifier (ID) for controlling a lighting attribute of each smart bulb 30 through communication with the bridge 20. A link button 21 that allows smart connection may be provided on the bridge 20.

As shown in FIG. 2, when an IP and a security ID are requested by using a panel interface of the smartwatch 10, the security ID and the IP obtained by the authentication server 40 are provided to the smartwatch 10. When the smartwatch 10 selects a lighting attribute such as power, saturation, brightness, or color temperature to be adjusted and transmits a command to the bridge 20, the bridge 20 transmits the command to the smart bulb 30. The smart bulb 30 receiving the command executes the command and transmits a result (completion/error) to the smartwatch 10 through the bridge 20. The smartwatch 10 may access the smart bulb 30 by using the security ID and the IP, and thus may control a lighting state (attribute) of the smart bulb 30 to a desired attribute.

3.3 System of Wearable Device

Figure 3:
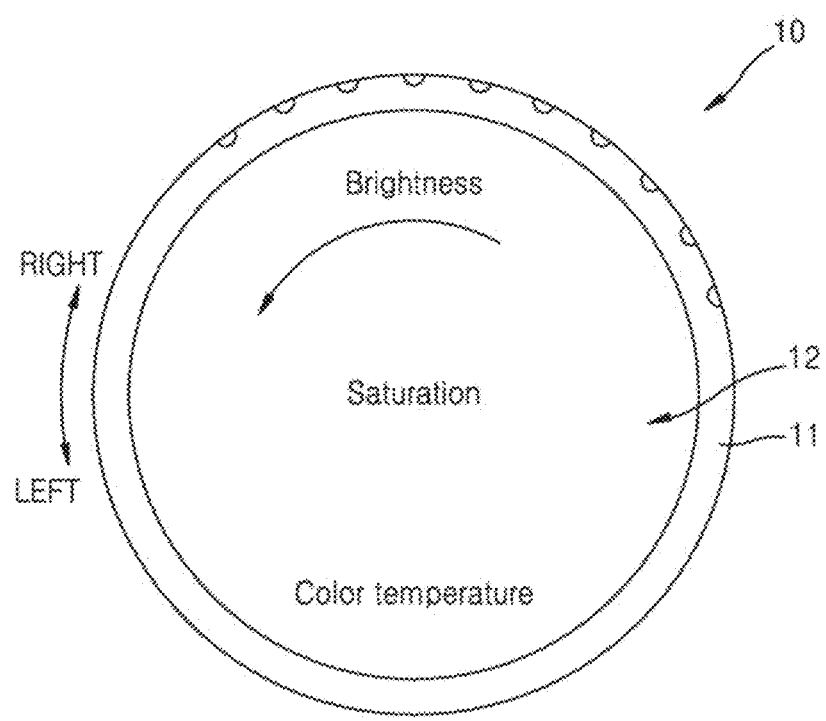
FIG. 3 is a diagram for explaining an outer appearance and each portion of the smartwatch according to the present disclosure.

Although there is a smartwatch having a rectangular screen, the present disclosure was designed based on the smartwatch 10 having a circular bezel 11 that is rotatable as shown in FIG. 3. In the background of a touchpanel 12 of the smartwatch 10, a color spectrum may be arranged in a circular shape according to adjusted hue values. A menu item to be selected such as brightness, saturation, or color temperature of a smart lamp may be located on the inside of the touchpanel 12.

When the smartwatch 10 is connected to the smart bulb 30 and then the circular bezel 11 is turned rightward for lighting control, for example, a hue value of the smart bulb 30 may be changed. In this case, the number of steps may be 24, and the hue value may be adjusted in a range from 0 to 65535. Menu items such as color temperature, brightness, and saturation may be displayed on the touchpanel (screen) of the smartwatch 10. If one of the menu items is selected, an attribute that is changed when the circular bezel 11 is rotated leftward may be changed. Before section, a specific menu item, for example, saturation, may be set to be basically changed. That is, if the smartwatch 10 is connected to the smart bulb 30 and then another attribute is not selected, a saturation value of the smart bulb 30 is changed when the circular bezel 11 is rotated leftward. Three lighting attributes, that is, saturation, brightness, and color temperature, may all be set to be increased by a predetermined value, for example, 1 when the circular bezel 11 is rotated. A saturation value may be adjusted in a range from 0 to 254, a color temperature value may be adjusted in a range from 2000 K to 6500 K, and a brightness value may be adjusted in a range from 1 to 254.

Figure 4:
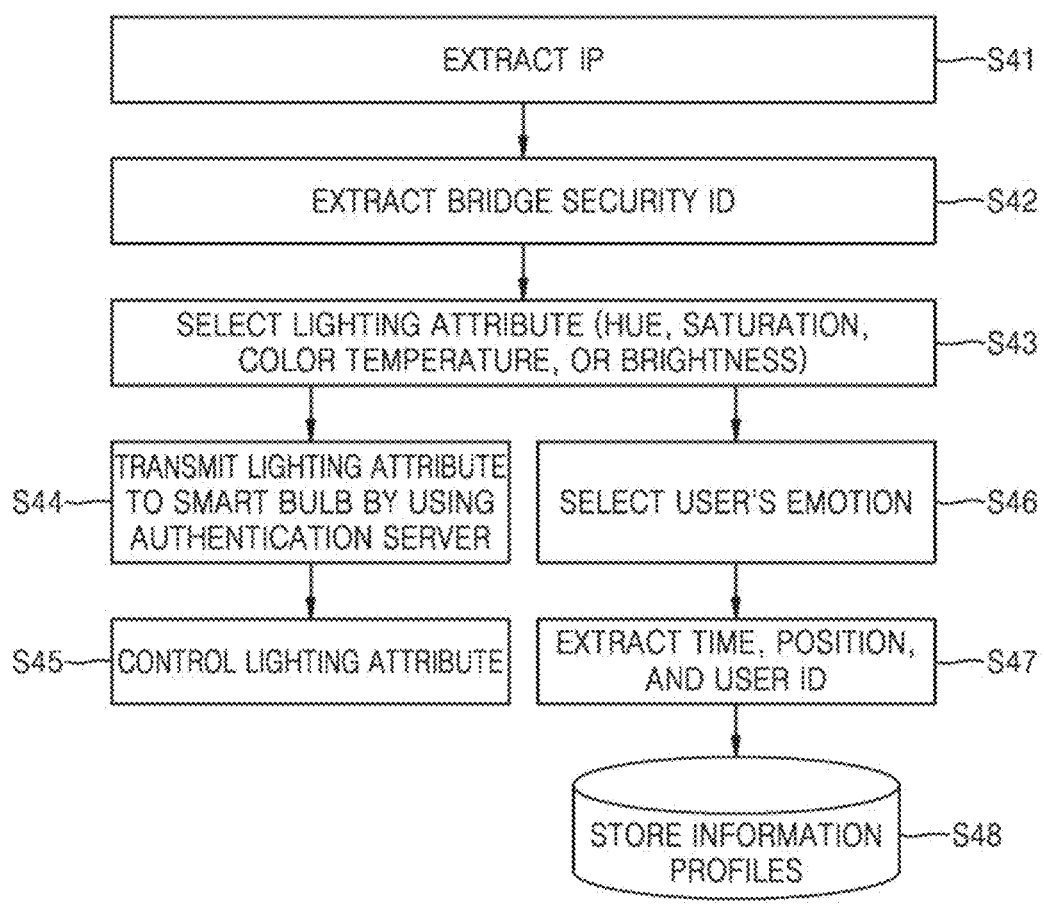
FIG. 4 is a flowchart of a detailed smart lighting control method according to the present disclosure.
Figure 5:
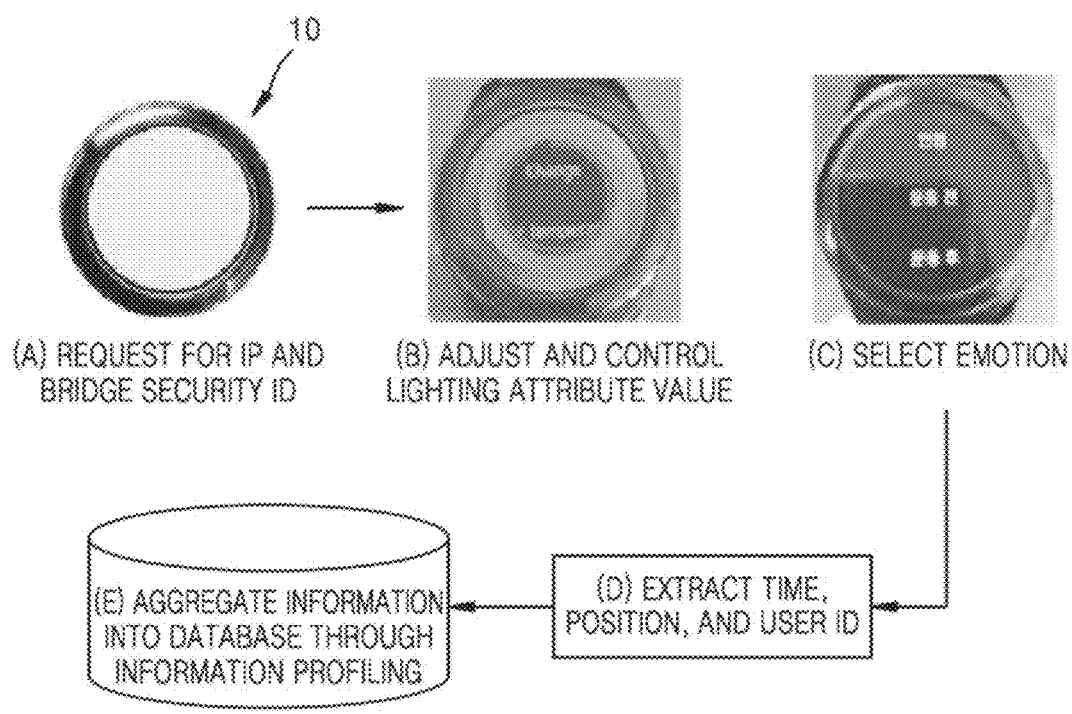
FIG. 5 is a diagram for explaining an actual operation of the smartwatch in each step of FIG. 4.

FIG. 4 is a flowchart of a detailed smart lighting control method according to the present disclosure. FIG. 5 is a diagram for explaining an actual operation of the smartwatch 10 in each step of FIG. 4. A method of connecting the smartwatch 10 to the smart bulb 30 and an operation thereof according to the present disclosure will now be described with reference to FIGS. 4 and 5.

An operation of the smartwatch 10 will be first described with reference to FIG. 5.

An IP and a bridge security ID are requested by using the smartwatch 10 to be obtained (A), and then a lighting attribute value is adjusted and controlled (B). When the smart bulb 30 is controlled and then an emotion is selected according to a user's selection (C), the user's ID, nickname, and time information that are additionally obtained are extracted (D) and are finally databaseed through information profiling (E). In this process, a link button for allowing connection to the bridge 20 may be provided, and when the link button is pressed, the smartwatch 10 may check the pressing and may become connectable. A Bluetooth connection method may be an example of such a method.

Referring to FIG. 4, the smartwatch 10 accesses the authentication server 40 through the bridge 20 to extract an IP assigned to the smart bulb 30 (S41). In this case, as described with reference to FIG. 1, since the smartwatch 10 and the smart bulb 30 may not directly communicate with each other, the bridge 20 between the smartwatch 10 and the smart bulb 30 is used as a communication repeater. The smartwatch 10 and the bridge 20 communicate with each other by using hypertext transfer protocol (HTTP).

First, in order to control the smart bulb 30, an ID of the bridge 20 has to be obtained. To this end, the authentication server 40 extracts a security ID for communicating with the smart bulb 30 by using the connected IP address (S42).

After the IP and the ID are obtained, by transmitting a control attribute value and an adjusted attribute value selected in the smartwatch 10 to the bridge 20 (command, S44), a lighting attribute such as brightness, saturation, or color temperature may be controlled (S45), and a current state of the smart bulb 30 may also be read. In addition, a process for generating the user's emotion information profiles (S48) may be additionally performed according to the present disclosure. In this case, when the user selects his/her emotion or state through a touchpanel of the smartwatch 10 (S46), the user's ID, nickname, and time information that are additionally obtained are extracted (S47) and the emotion information profiles (S48) are stored. The user's ID, nickname, and time information along with the lighting attribute selected in operation S43 may be stored as a database in the emotion information profiles (S48).

A method of controlling the smart bulb 30 will now be described in detail.

Communication with the authentication server 40 is performed through the bridge 20 by using the IP and the ID extracted to control the smart bulb 30 as described above. In this case, a command related to power, hue, brightness, etc. of the smart bulb 30 is transmitted in a JavaScript object notation (JSON) format by using a PUT method of HTTP. A current state of the smart bulb 30 may be detected by using a GET method.

The following <Code 1> is source code of a GET method or function for checking a state of the smart bulb 30.

<Code 1>

```
function get( ) {
    var req = new XMLHttpRequest( );
    var type = 'GET';
    var url = 'http://' + ip + '/api/' + hue_id + '/lights/1';
    req.onreadystatechange = function( ) {
        if (req.readyState == 4) {
            if (req.status === 200) {
                var a = JSON.parse('[' + req.responseText + ']');
                var c = " [" + JSON.stringify(a[0].state, null, '\t't') +
"]";
                var d = JSON.parse(c);
                var b = d[0].hue;
                var b2 = d[0].ct;
                var b3 = d[0].sat;
                var b4 = d[0].bri;
                hue = b;
                ct = b2;
                sat = b3;
                bri = b4;
            }
            else {
                alert('fail');
            }
        }
    }
    req.open(type, url, true);
    req.send( );
    return true;
};
```

If the smartwatch 10 and the smart bulb 30 are connected, for example, a hue value may be changed when the circular bezel 11 is rotated rightward, and a saturation value may be changed when the circular bezel 11 is rotated leftward. When an attribute is changed in a list displayed on the touchpanel of the smartwatch 10, a brightness value and a color temperature value may also be controlled by using a wheel interface.

The following <Code 2> that is source code for detecting a change in an attribute value according to rotation of the circular bezel 11 of the smartwatch 10 shows a change in a hue value during clockwise rotation and a change in each attribute value selected during counterclockwise rotation. In the above source code, CT_CHANGE( ) is a heat temperature change function, BRI_CHANGE( ) is a brightness change function, and SAT_Change( ) is a saturation change function.

<Code 2>

```
document.addEventListener("rotarydetent", function(ev){
    var direction = ev.detail.direction;
        if (direction == "CW") {
            if (first == '1') {
                get( );
                first='2'; }
            hue += 2730;
            if (hue > 65535) { hue = 2730; }
            hue_change(hue);
        }
        else {
            if (first == '1') {
                get( );
                first='2';
            }
            if (mode == 'cc') { ct += 58;
                if (ct == 501) { ct = 500; }
                else if(ct>501){ ct=153; }
                ct_change(ct);
            }
            else if (mode == 'bb') { bri += 50;
                if (bri == 251) { bri = 254; }
                else if(bri>254){ bri=254; }
                bri_change(bri);
            }
            else { sat += 50;
                if (sat == 250) { sat = 254; }
                else if(sat>254){ sat=0; }
                sat_change(sat);
            }
        }
});
```

On an edge portion of the touchpanel of the smartwatch 10 used to change an attribute of the smart bulb 30, two status bars may be located so that when a lighting attribute is to be changed, the user may estimate each attribute value before the lighting attribute is changed. A value of the inner status bar is changed whenever a wheel is rotated to change a saturation value, a brightness value, or a color temperature value, and the outer status bar shows a color of a corresponding hue value.

<Code 3>

```
function ct_change(light) {
    var req = new XMLHttpRequest( );
    var type = 'PUT';
    var url = 'http://' + ip + '/api/' + hue_id + '/lights/1/state';
    req.onreadystatechange = function( ) {
        if (req.readyState == 4) {
            if (req.status === 200) {
            }
            else {
                alert('fail');
            }
        }
        else if (1 <= req.readyState <= 3) {
            //loading
        }
    }
    req.open(type, url, true);
    req.send('{"ct":'+ light + '}');
    return true;
};
```

The above <Code 3> shows source code of a color temperature change function.

The user's ID, time information, position information, lighting attributes, and emotion information are included in the emotion information profiles. The user's ID may be created as a unique ID of the device, and may be added when the user may set his/her nickname. Regarding the lighting attributes, hue, saturation, color temperature, and brightness values when the user controls lighting are stored in a session storage. When the user selects an emotion when wanting to store the emotion information profiles, the user obtains a latest lighting attribute value from the session storage. Date and time information are extracted by using a date object, a latitude and a longitude are extracted by using a global positioning system (GPS) in a smartphone connected through Bluetooth to the smartwatch 10 by using a Samsung accessory protocol (SAP), and an address is obtained by using the obtained latitude and longitude. The latitude, the longitude, and the address may be transmitted to the smartwatch 10 again by using the SAP, and data may be managed by using an indexed database in the smartwach 10.

| ID | Alias | Time | Hue | Saturation | Color temperature | Brightness | Emotion | Latitude | Longitude | Address |
|---|---|---|---|---|---|---|---|---|---|---|
| NNT2H MAaRS HGliel_1 HzkayN XxQA = | smu | 2013 0322 1257 47 | 14922 | 144 | 369 | 254 | stable | 37.6027119 | 126.954673 | Hongji-dong, Jongno-gu, Seoul, Korea |
| NNT2H MAaRS HGliel_1 HzkayN XxQA = | smu | 2013 0323 1745 02 | 59000 | 254 | 369 | 250 | tired | 37.6027119 | 126.954673 | Hongji-dong, Jongno-gu, Seoul, Korea |

Pieces of information desired to be stored are produced in the JSON format in order to store personal information by using the indexed database. A keypath and an objectStore are created, and data processed in a JSON format is added. Values of other keys of a corresponding index may be obtained by using a designated keypath value when information of personal information profiles is necessary.

In lighting control using an existing smartphone, when a user wants to control other attributes again after a hue value is selected, the user has to select other attributes such as saturation and brightness again on other attribute control windows. Since such an interface is used, it is not easy to achieve desired lighting at a time, and when undesired lighting appears, various attributes such as hue and saturation have to be inconveniently selected again in order to select lighting. However, when lighting is controlled by using a smartwatch using a wheel interface, a saturation value may be controlled at the same as a hue value is determined, and when undesired lighting appears, desired lighting may be easily controlled at a time by simply changing a direction of the wheel interface. Since a color of lighting currently selected before a value is transmitted in hue control may be known by using a color of a status bar, the user may not need to adjust a color again when lighting is controlled and a desired color is not achieved. Since a percentage is shown on the status bar so that the user may predict what lighting is like when a saturation, brightness, or color temperature value, as well as a hue value, is to be adjusted, the user may adjust a desired level. A disadvantage is that rightward or leftward rotation of a general wheel interface is not for control of another attribute value but for control of an increase/decrease in the same attribute value.

In the wheel interface according to the present disclosure, as shown in FIG. 5, since rightward rotation and leftward rotation of the wheel interface are for control of different attribute values, in order to reduce an attribute value, the wheel interface is not rotated in the opposite direction, but the attribute value has to be increased to 100%, has to be reduced to 0%, and then has to be increased to a desired value again. Such a control method may be confusing for first-time users. In order to more finely adjust lighting attributes, each attribute value may be set to be increased by 1 when the user rotates the wheel once. However, there is a case where since a total value of the attribute value is greater than 100, although the attribute value is increased, a percentage displayed on the status bar is not increased. Accordingly, when the user controls the wheel interface, the attribute value may be changed, whereas the percentage on the status bar may not be changed, thereby leading to confusion. When the user controls attribute values in a value adjustment process, since the user may not see the attribute values and may see only the status bar, the user may not know specific values and has to visually guess values inconveniently. Since a background operation in which a color or a percentage of the status bar is adjusted and displayed again is performed whenever the wheel interface is operated, the smartwatch may not operate and may stop when various operations of the wheel interface are performed at a time.

Figure 6:
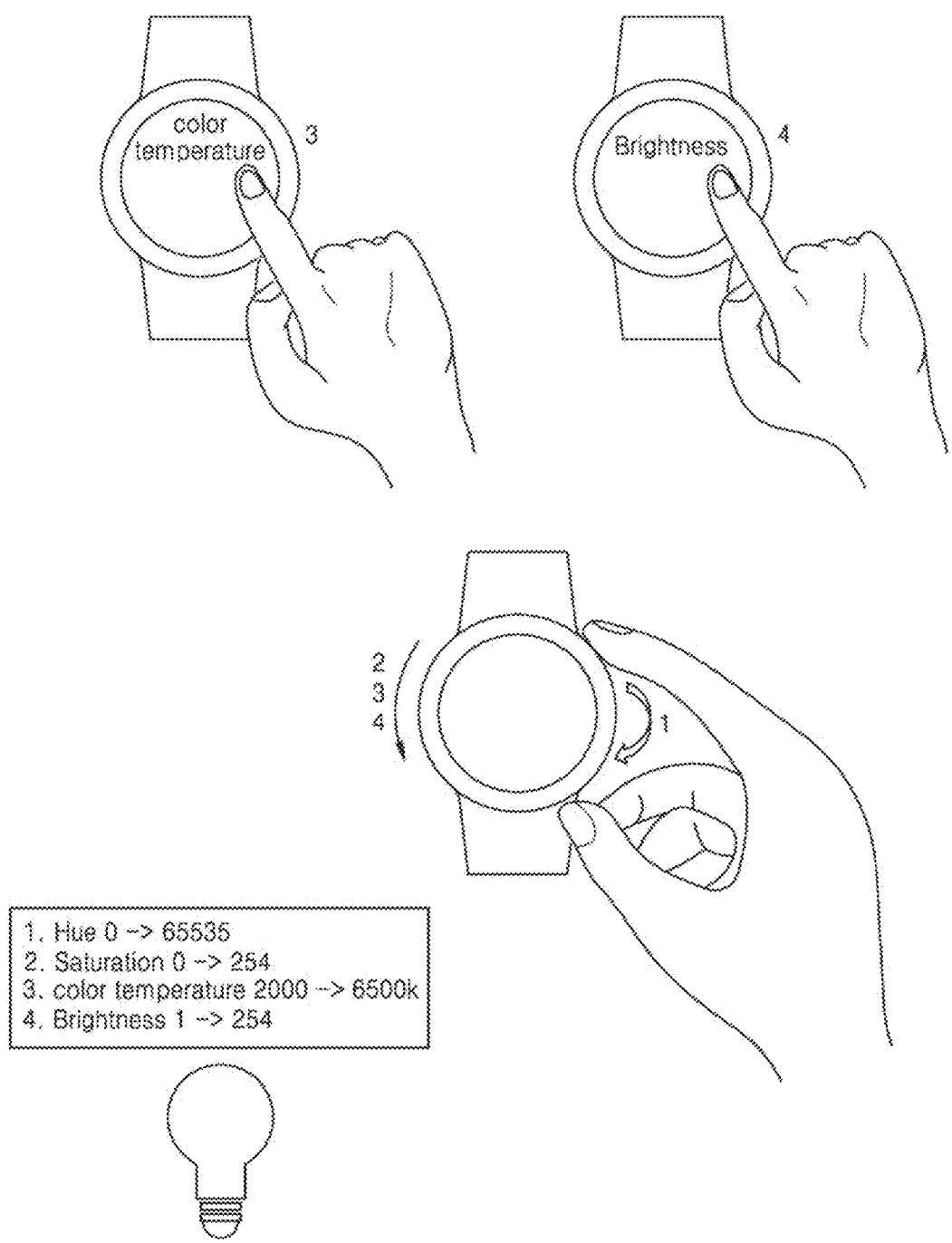
FIG. 6 illustrates a change in a hue value of a lighting lamp according to a smart lighting control method of the present disclosure.
Figure 7:
FIG. 7 illustrates a change in a color temperature value of a lighting lamp according to a smart lighting control method of the present disclosure.
Figure 8:
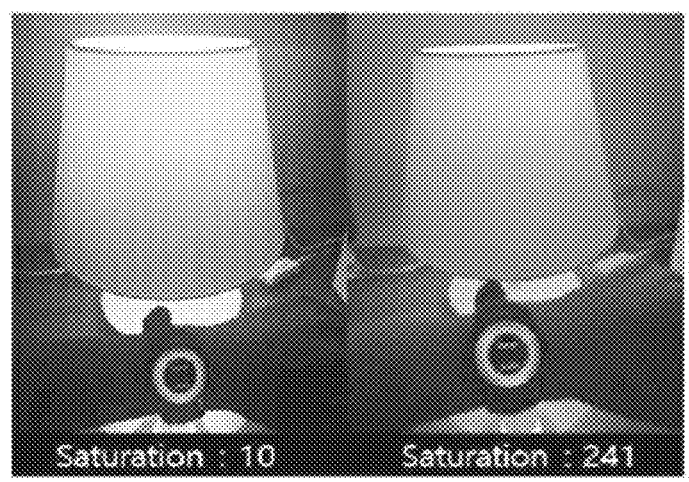
FIG. 8 illustrates a change in a saturation value of brightness of a lighting lamp according to a smart lighting control method of the present disclosure.
Figure 9:
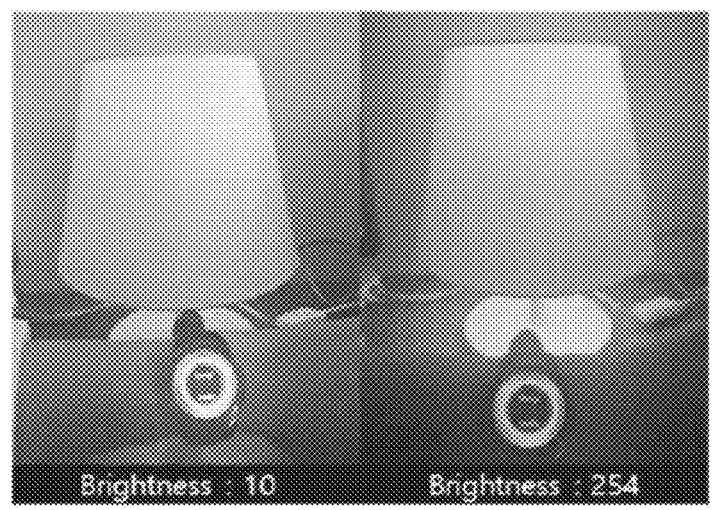
FIGS. 9 and 10 illustrate a change in a color temperature value of a lighting lamp according to a smart lighting control method of the present disclosure.
Figure 10:
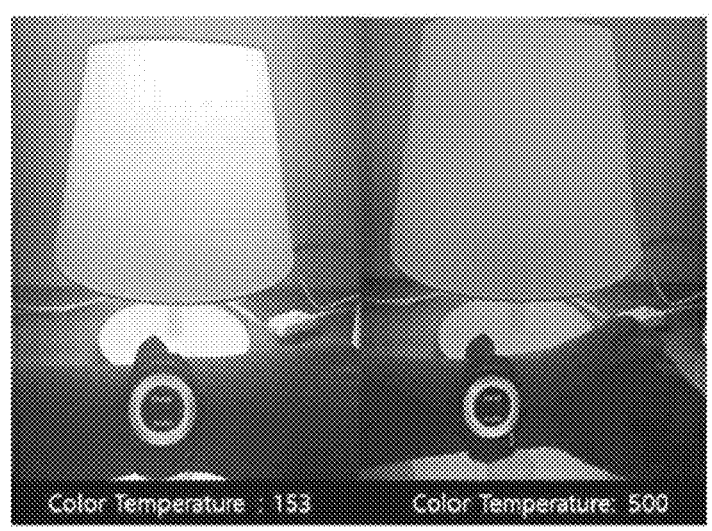

FIG. 6 illustrates a change in a hue value of a lighting lamp according to a smart lighting control method of the present disclosure. FIG. 7 illustrates a change in a color temperature value. FIG. 8 illustrates a saturation value of brightness. FIG. 9 illustrates a change in a color temperature value.

FIGS. 11A through 11D illustrate an interface screen showing an operation of the smartwatch 10 having the circular bezel 11 according to the present disclosure.

Figure 11A:
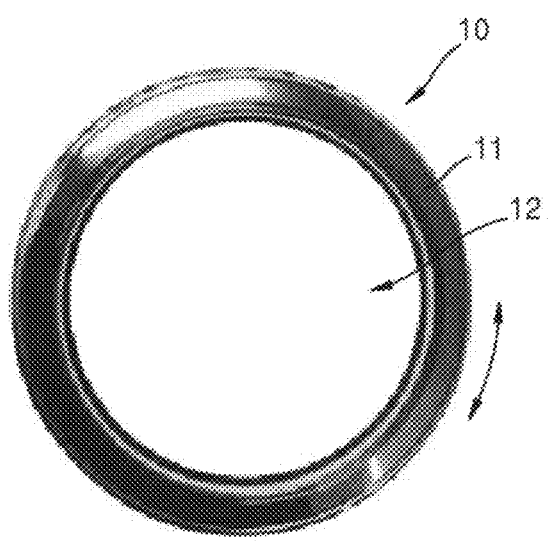
FIGS. 11A through 11D illustrate an interface screen showing an operation of the smartwatch having a circular bezel according to the present disclosure.
Figure 11B:
Figure 11C:
Figure 11D:
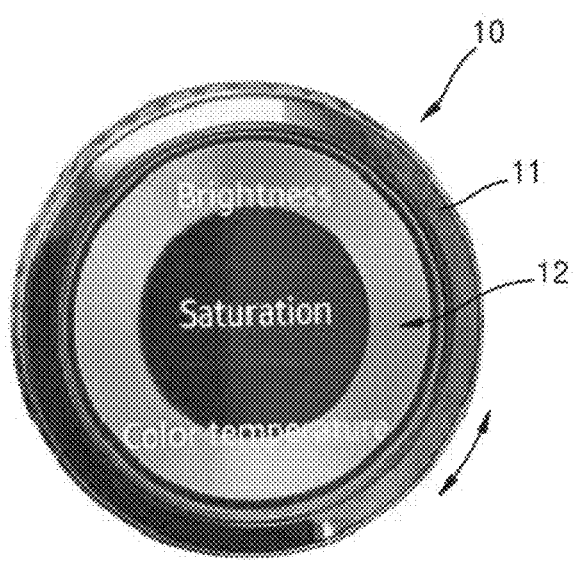

FIG. 11A that is an initial screen for smart control illustrates an example where when a button of a bridge for connection to the smart bulb 30 is pressed and a picture is clicked, an operation proceeds to a next step. FIG. 11B illustrates an example where when a button of the screen is clicked in a state where the button of the bridge for connection is not pressed, a notification is displayed on an interface screen. FIG. 11C that is a screen when connection with the smart bulb 30 succeeds illustrates an on-off button of the smart bulb 30. FIG. 11D that is a menu screen for attribute control illustrates an example where saturation that is an item in the middle of the screen is an object to be controlled by finger manipulation. When the user swipes the interface screen up or down with his/her finger, a selected item may be changed.

5.2 CONCLUSION

In the present disclosure, a system for controlling lighting by using a wheel interface having a circular bezel has been developed. The system may overcome the limitation of a small display screen of a smartwatch, may improve ease of use, and may control hue, saturation, brightness, and color temperature values of lighting by simply rotating the circular bezel. A user's emotion profiles are generated by storing the user's emotion, position, time, and lighting attribute values by using a database in order to profile the user's emotion information. Since the smartwatch is always worn on the user's wrist, the smartwatch does not need to be carried or prepared in order to control lighting. Since the wheel interface is used, it does not take many operations for the user to control lighting and the user may adjust lighting to desired lighting in detail by using the simple rotatable interface. The user's emotion information is profiled by combining an emotion selected by the user by using the user's time and position information, as well as lighting control. Although this study ends in a step of storing the emotion information, a lighting attribute value may be recommended to the user or the user's emotion state may be led to be changed by using the profiled information later.

The invention claimed is:

1. A smart lighting control method comprising:
   operating a smart bulb comprising a light-emitting diode (LED) lamp and a controller configured to control at least one lighting attribute of the light-emitting diode (LED) lamp from among saturation, brightness, and color temperature thereof;
   obtaining a current attribute of the LED lamp by using a smartwatch communicatably connected to the controller;
   selecting a lighting attribute to be controlled through an interface panel of the smartwatch;
   obtaining a control attribute value for adjusting the lighting attribute by using a wheel interface having a circular bezel provided around the smartwatch; and
   transmitting the control attribute value from the smartwatch to the smart bulb and adjusting the lighting attribute of the smart bulb by using the control attribute value.

2. The smart lighting control method of claim 1, wherein a bridge is wirelessly connected between the smartwatch and the smart bulb and configured to connect the smartwatch to the smart bulb.

3. The smart lighting control method of claim 2, wherein the lighting attribute to be controlled varies according to a rotation direction of the circular bezel.

4. The smart lighting control method of claim 3, wherein the bridge is further configured to provide authentication information for connecting the smartwatch to the smart bulb.

5. The smart lighting control method of claim 4, wherein the bridge is further configured to obtain the authentication information from an authentication server that is provided separately.

6. A smart lighting system comprising:
   a smart bulb comprising a light-emitting diode (LED) lamp, a controller configured to control the LED lamp, and a communicator; and
   a smartwatch comprising a wheel interface having a circular bezel, wirelessly connected to the smart bulb, and configured to control an attribute of the smart bulb,
   wherein the controller is further configured to operate the LED lamp and control at least one lighting attribute from among hue, brightness, and color temperature of the LED lamp, and
   the smartwatch is further configured to obtain a current attribute of the LED lamp through communication with the controller and select a lighting attribute to be controlled through an interface panel of the smartwatch,
   wherein the wheel interface having the circular bezel provided around the smartwatch is configured to control a control attribute value for adjusting the lighting attribute, and
   the controller is further configured to transmit the control attribute value of the smartwatch to the LED lamp and adjust the lighting attribute of the LED lamp.

7. The smart lighting system of claim 6, further comprising a bridge configured to relay communication between the smartwatch and a smart electrode.

8. The smart lighting system of claim 7, wherein the lighting attribute to be controlled varies according to a direction of the circular bezel.

9. The smart lighting system of claim 7, wherein the bridge is further configured to provide authentication information for connecting the smartwatch to the smart bulb.

10. The smart lighting system of claim 6, wherein the lighting attribute to be controlled varies according to a direction of the circular bezel.

* * * * *